US010596992B2

(12) United States Patent
Choi

(10) Patent No.: US 10,596,992 B2
(45) Date of Patent: Mar. 24, 2020

(54) VARIABLE CONTROL APPARATUS FOR AIRBAG OF VEHICLE

(71) Applicants: Hyundai Motor Company, Seoul (KR); Kia Motors Corporation, Seoul (KR)

(72) Inventor: Jae Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 15/828,239

(22) Filed: Nov. 30, 2017

(65) Prior Publication Data

US 2019/0111880 A1 Apr. 18, 2019

(30) Foreign Application Priority Data

Oct. 16, 2017 (KR) .................. 10-2017-0133857

(51) Int. Cl.
*B60R 21/216* (2011.01)
*B60R 21/015* (2006.01)
(Continued)

(52) U.S. Cl.
CPC .......... *B60R 21/216* (2013.01); *B60R 21/013* (2013.01); *B60R 21/015* (2013.01); *B60R 21/01552* (2014.10); *B60R 21/01554* (2014.10); *B60R 21/205* (2013.01); *B60R 21/2338* (2013.01); *B60R 21/263* (2013.01); *B60R 2021/0032* (2013.01); *B60R 2021/0044* (2013.01); *B60R 2021/0048* (2013.01);
(Continued)

(58) Field of Classification Search
CPC ............... B60R 21/216; B60R 21/015; B60R 2021/0032
See application file for complete search history.

(56) References Cited

U.S. PATENT DOCUMENTS 6,076,854 A * 6/2000 Schenck ............... B60R 21/233
280/728.1
6,254,130 B1 * 7/2001 Jayaraman ........... B60R 21/233
280/731
(Continued)

FOREIGN PATENT DOCUMENTS

KR 20-0280030 Y1 6/2002
KR 20150074873 A 7/2015

*Primary Examiner* — Darlene P Condra
(74) *Attorney, Agent, or Firm* — Mintz Levin Cohn Ferris Glovsky and Popeo, P.C.; Peter F. Corless

(57) ABSTRACT

A variable control apparatus for an airbag of a vehicle includes: a plurality of tethers each of which having one side coupled to a front sheath among a plurality of sheaths of an airbag cushion, each of the plurality of tethers formed to have a length shorter than a distance between the front sheath and a rear sheath when the airbag cushion is fully deployed; a release mechanism provided at a rear sheath side of the airbag cushion, connected to the respective other sides of the plurality of tethers, and selectively releasing a tether among the plurality of tethers upon an operation of the release mechanism; and a controller configured to variably control a deployment shape of the airbag cushion by operating the release mechanism based on a collision direction of the vehicle, a seat state of a seat of the vehicle, or a sitting posture of a passenger in the vehicle.

17 Claims, 11 Drawing Sheets

(51) Int. Cl.
  *B60R 21/263* (2011.01)
  *B60R 21/013* (2006.01)
  *B60R 21/2338* (2011.01)
  *B60R 21/205* (2011.01)
  *B60R 21/00* (2006.01)
  *B60R 21/01* (2006.01)

(52) U.S. Cl.
  CPC ............... *B60R 2021/01238* (2013.01); *B60R 2021/23384* (2013.01); *B60R 2021/23388* (2013.01); *B60R 2021/2633* (2013.01)

(56) References Cited

U.S. PATENT DOCUMENTS

| | | | | |
|---|---|---|---|---|
| 6,315,323 B1* | 11/2001 | Pack, Jr. | ............... | B60R 21/233 280/735 |
| 6,616,184 B2* | 9/2003 | Fischer | ................ | B60R 21/205 280/735 |
| 6,918,611 B1* | 7/2005 | Winters | ............... | B60R 21/233 280/735 |
| 7,093,854 B2* | 8/2006 | Fischer | ............... | B60R 21/2338 280/743.2 |
| 7,198,290 B2* | 4/2007 | Yamada | ............... | B60R 21/233 280/731 |
| 7,552,942 B2* | 6/2009 | Fischer | ............... | B60R 21/2338 280/734 |
| 2004/0104564 A1* | 6/2004 | Hawthorn | ............. | B60R 21/233 280/743.2 |

* cited by examiner

VARIABLE CONTROL APPARATUS FOR AIRBAG OF VEHICLE

CROSS REFERENCE TO RELATED APPLICATION

The present application claims the benefit of priority to Korean Patent Application No. 10-2017-0133857 filed on Oct. 16, 2017, the entire contents of which are incorporated herein by reference.

BACKGROUND OF THE DISCLOSURE

Technical Field

The present disclosure relates generally to vehicular safety and, more particularly, to an apparatus performing variable control of an airbag of a vehicle.

Description of the Related Art

Generally, an airbag apparatus is installed in a vehicle as a safety device for protecting a driver and passengers from injury in the case of collision involving the vehicle. There are various types of airbag apparatuses such as an airbag apparatus for the driver, an airbag apparatus for the passenger(s), an airbag apparatus for protecting from side collision, and the like.

Meanwhile, a seat of a vehicle may be operated in various ways according to a body type or preferences of a passenger. For example, the passenger may maintain a normal sitting state, or may adjust the seat to increase or decrease a reclining angle of a seat back. Recently, seats have been designed to rotate based on a vertical rotation axis, allowing the seat to rotate so that the passenger faces rearward.

In light of the developments described above, variable airbag controls according to seat states are needed.

The contents described as the related art have been provided only for assisting in the understanding for the background of the present disclosure and should not be considered as corresponding to the related art known to those skilled in the art.

SUMMARY OF THE DISCLOSURE

Accordingly, the present disclosure has been made keeping in mind the above problems occurring in the related art. The present disclosure is intended to propose a variable control apparatus for an airbag of a vehicle, which variably controls a shape of a front airbag deployed in the event of a front collision of the vehicle according to various operation states of a vehicle seat, thereby maximizing passenger protection.

According to embodiments of the present disclosure, a variable control apparatus for an airbag of a vehicle includes: a plurality of tethers each of which having one side coupled to a front sheath among a plurality of sheaths of an airbag cushion, each of the plurality of tethers formed to have a length shorter than a distance between the front sheath and a rear sheath when the airbag cushion is fully deployed; a release mechanism provided at a rear sheath side of the airbag cushion, connected to the respective other sides of the plurality of tethers, and selectively releasing a tether among the plurality of tethers upon an operation of the release mechanism; and a controller configured to variably control a deployment shape of the airbag cushion by operating the release mechanism based on a collision direction of the vehicle, a seat state of a seat of the vehicle, or a sitting posture of a passenger in the vehicle.

Upon a front collision of the vehicle, if a seat is in the state in which an angle of rotation of the seat from a reference position is smaller than a first setting angle to face a front side of the vehicle, and a reclining angle formed between a seat cushion and a seat back of the seat is a reference angle or smaller, the controller may deploy the airbag cushion and operate the release mechanism to release all the plurality of tethers.

The variable control apparatus for an airbag of a vehicle may further include: an inflator provided to deploy the airbag cushion in a high-pressure mode, a middle-pressure mode, or a low-pressure mode based on a deployment pressure when deploying the airbag cushion, in which upon the front collision of the vehicle, when the seat is in the state in which the angle of rotation of the seat from the reference position is smaller than the first setting angle to face the front side of the vehicle, and the reclining angle formed between the seat cushion and the seat back is the reference angle or smaller, the controller may operate the inflator in the high-pressure mode.

Upon a front collision of the vehicle, when the seat is in a state in which an angle of rotation of the seat from a reference position is smaller than a first setting angle to face a front side of the vehicle, and a reclining angle formed between a seat cushion and a seat back of the seat is larger than a reference angle, the controller may inhibit deployment of the airbag cushion.

Upon a front collision of the vehicle, when the seat is in a state in which an angle of rotation of the seat from a reference position is larger than a second setting angle to face a rear side of the vehicle, a distance between a headrest or seatback of the seat and a crash pad is a setting distance or longer, and a reclining angle formed between a seat cushion and the seat back of the seat is a reference angle or smaller, the controller may deploy the airbag cushion, but inhibit an operation of the release mechanism.

The variable control apparatus for an airbag of a vehicle may further include: an inflator configured to deploy the airbag cushion in a high-pressure mode, a middle-pressure mode, or a low-pressure mode based on a deployment pressure when deploying the airbag cushion, in which upon the front collision of the vehicle, when the seat is in the state in which the angle of rotation of the seat from the reference position is larger than the second setting angle to face the rear side, the distance between the headrest or seatback of the seat and the crash pad is the setting distance or longer, and the reclining angle formed between the seat cushion and the seat back is the reference angle or smaller, the controller may operate the inflator in the low-pressure mode.

Upon a front collision of the vehicle, when the seat is in a state in which an angle of rotation of the seat from a reference position is larger than a second setting angle to face a rear side of the vehicle, a distance between a headrest or seatback of the seat and a crash pad is shorter than a setting distance, and a reclining angle formed between a seat cushion and the seat back of the seat is larger than a reference angle, the controller may inhibit of deployment of the airbag cushion.

The front sheath of the airbag cushion may be divided into an upper portion proximate a head of the passenger when the airbag cushion is deployed, and a lower portion that is a portion proximate a chest of the passenger when the airbag cushion is deployed, and the plurality of tethers may include a first upper tether having one side coupled to a left side of the upper portion of the front sheath, a second upper tether having one side coupled to a right side of the upper portion of the front sheath, and a lower tether having one side coupled to the lower portion of the front sheath.

Upon a front collision of the vehicle, when the seat is rotated from a reference position based on a vertical rotation axis in a clockwise direction at a predetermined setting angle range to face a right side of the vehicle, the controller may deploy the airbag cushion and operate the release mechanism to release the first upper tether.

Upon a front collision of the vehicle, when the seat is rotated from a reference position based on a vertical rotation axis in a counterclockwise direction at a predetermined setting angle range to face a left side of the vehicle, the controller may deploy the airbag cushion and operate the release mechanism to release the second upper tether.

The variable control apparatus for an airbag of a vehicle may further include: an inflator configured to deploy the airbag cushion in a high-pressure mode, a middle-pressure mode, or a low-pressure mode based on a deployment pressure when deploying the airbag cushion, upon of the front collision of the vehicle, when the seat is rotated based on the vertical rotation axis in the clockwise or counter-clockwise direction at the setting angle range, the controller may operate the inflator in the middle-pressure mode.

The lower tether may include a first lower tether having one side coupled to a left side of the lower portion of the front sheath, and a second lower tether having one side coupled to a right side of the lower portion of the front sheath of the airbag cushion.

Upon a left side oblique collision of the vehicle, when the seat is in a state in which an angle of rotation of the seat from a reference position is smaller than a first setting angle to face a front side of the vehicle, the controller may deploy the airbag cushion and operate the release mechanism to release the first lower tether.

Upon a right side oblique collision of the vehicle, when the seat is in a state in which an angle of rotation of the seat from a reference position is smaller than a first setting angle to face a front side of the vehicle, the controller may deploy the airbag cushion and operate the release mechanism to release the second lower tether.

Upon the front collision of the vehicle, when the seat is slid in a left side direction from a reference position by a setting distance or longer, the controller may deploy the airbag cushion and operate the release mechanism to release the first lower tether.

Upon the front collision of the vehicle, when the seat is slid in a right side direction from a reference position by a setting distance or longer, the controller may deploy the airbag cushion and operate the release mechanism to release the second lower tether.

Furthermore, according to embodiments of the present disclosure, a variable control apparatus for an airbag of a vehicle includes: a plurality of tethers each of which having one side coupled to a front sheath among a plurality of sheaths of an airbag cushion, each of the plurality of sheaths formed to have a length shorter than a distance between the front sheath and a rear sheath when the airbag cushion is fully deployed by constrainers and is extended when constraint is released; a release mechanism provided at the rear sheath side of the airbag cushion, connected to the respective constrainers of the plurality of tethers, and selectively releasing constraint of a constrainer among the connected constrainers upon an operation of the release mechanism; and a controller configured to variably control a deployment shape of the airbag cushion by operating the release mechanism based on a collision direction of the vehicle, a seat state of a seat of the vehicle, or a sitting posture of a passenger of the vehicle.

BRIEF DESCRIPTION OF THE DRAWINGS

The above and other objects, features and advantages of the present disclosure will be more clearly understood from the following detailed description taken in conjunction with the accompanying drawings, in which.

Figure 1:
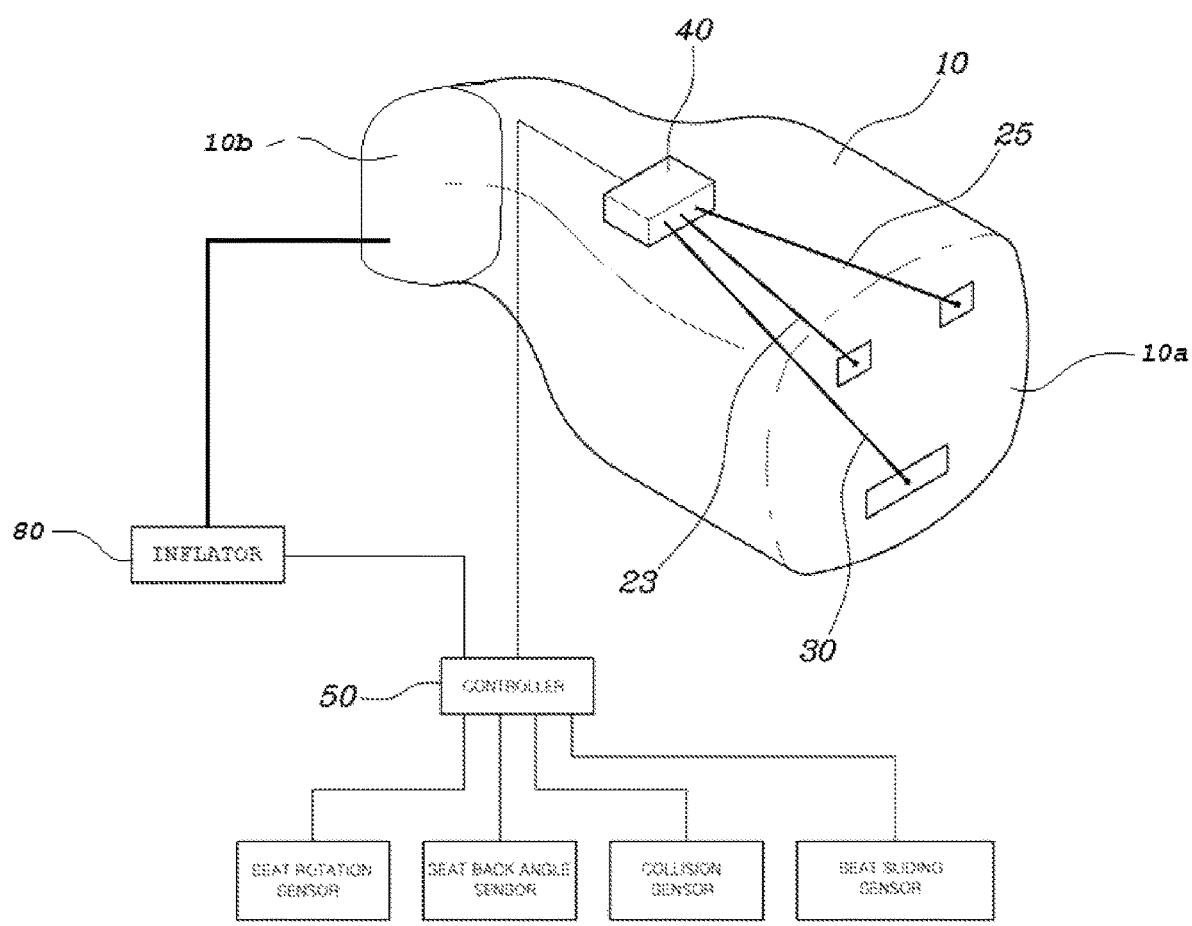
FIGS. 1 and 2 are views illustrating a variable control apparatus for an airbag of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, a variable control apparatus for an airbag of a vehicle according to embodiments of the present disclosure will be described with reference to the accompanying drawings.

Figure 2:
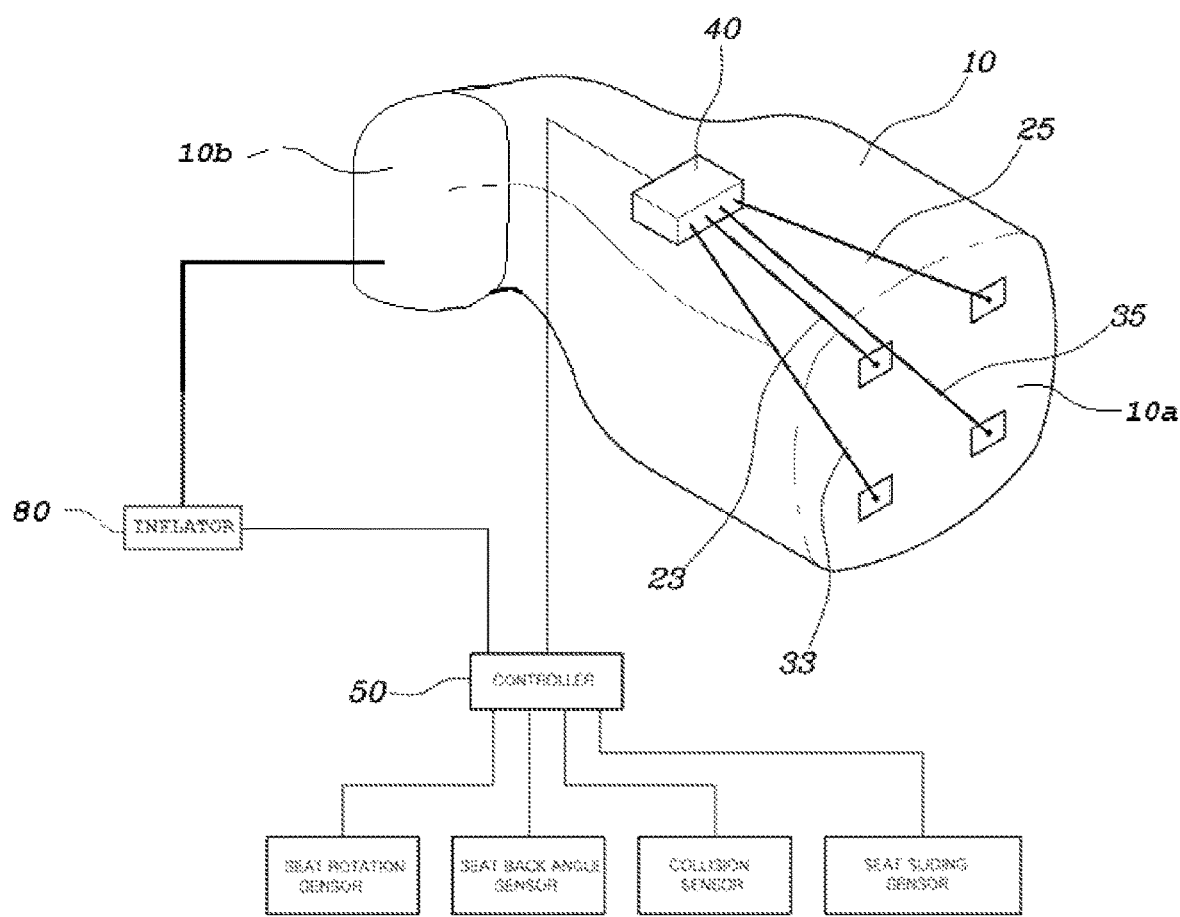
Figure 3:
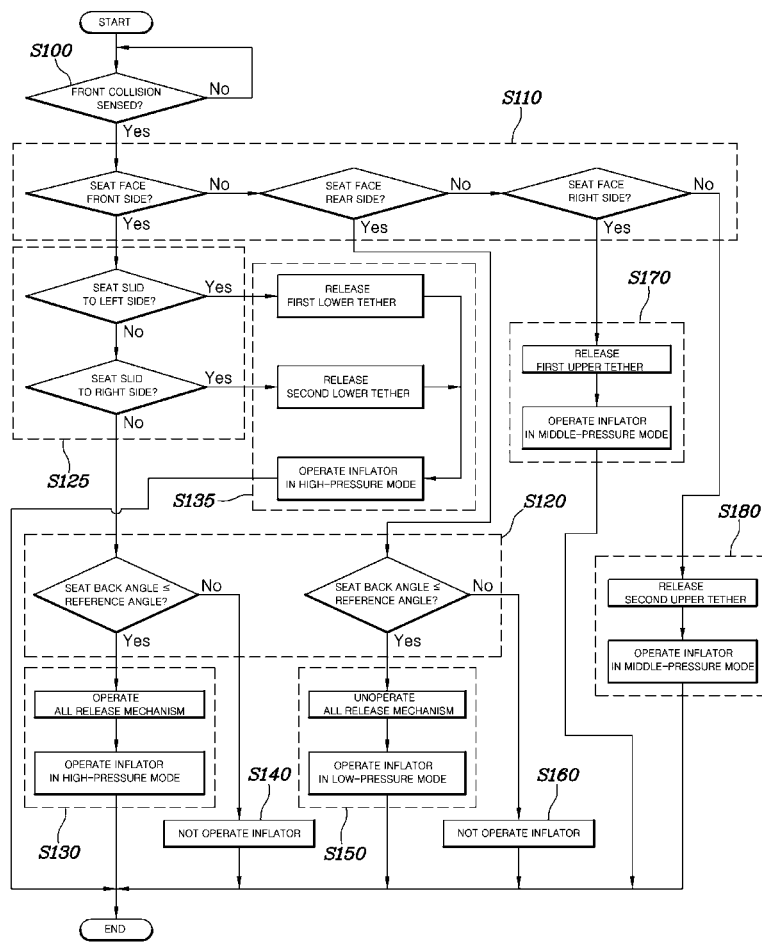
FIG. 3 is a flow chart illustrating a variable control method for an airbag of a vehicle at the time of front collision according to embodiments of the present disclosure.
Figure 4:
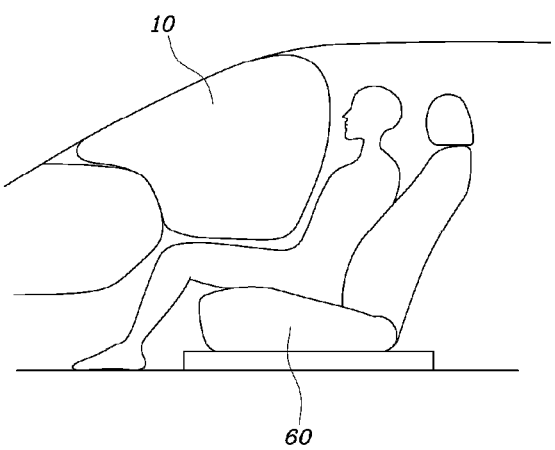
FIG. 4 is a side view illustrating a deployment shape of an airbag cushion according to embodiments of the present disclosure, in a case in which a seat faces a front side of the vehicle and a reclining angle of a seat back is a predetermined angle or smaller.
Figure 5:
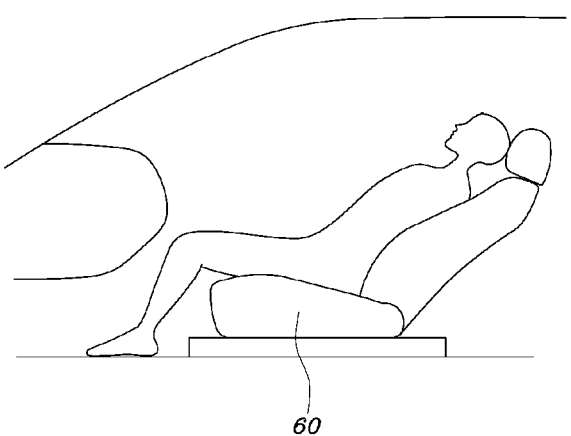
FIG. 5 is a side view illustrating an inside of the vehicle according to embodiments of the present disclosure, in a case in which a seat faces a front side of the vehicle and a reclining angle of a seat back is a predetermined angle or larger.
Figure 6:
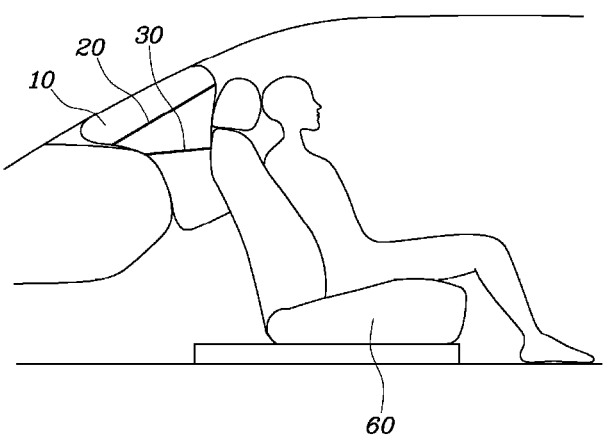
FIG. 6 is a side view illustrating an inside of the vehicle according to embodiments of the present disclosure, in a case in which a seat faces a rear side of the vehicle and a reclining angle of a seat back is a predetermined angle or smaller.
Figure 7:
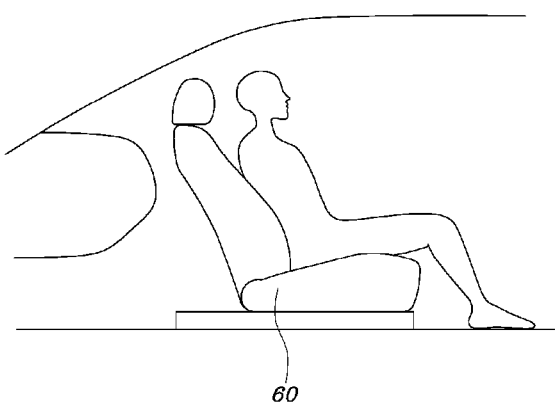
FIG. 7 is a side view illustrating a deployment shape of the airbag cushion according to embodiments of the present disclosure, in a case in which a seat faces a rear side of the vehicle and a reclining angle of a seat back is a predetermined angle or larger.
Figure 8:
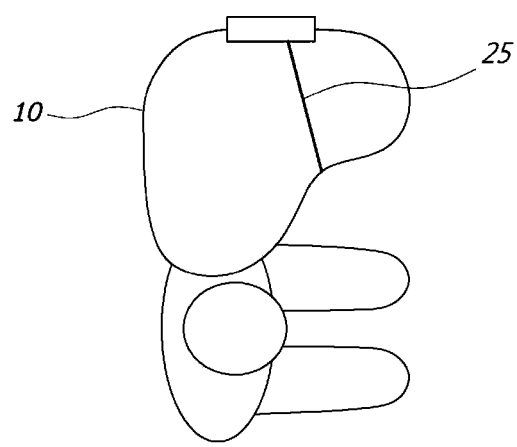
FIG. 8 is a plan view illustrating a deployment shape of the airbag cushion according to embodiments of the present disclosure, in a case in which a seat faces a right side of the vehicle.
Figure 9:
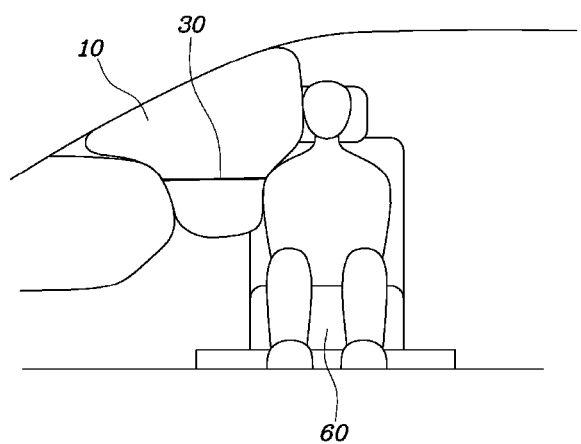
FIG. 9 is a side view illustrating a deployment shape of the airbag cushion according to embodiments of the present disclosure, in a case in which a seat faces a side of the vehicle.
Figure 10:
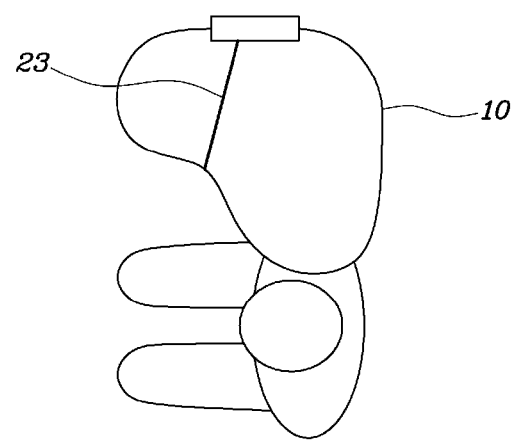
FIG. 10 is a plan view illustrating a deployment shape of the airbag cushion according to embodiments of the present disclosure, in a case in which a seat faces a left side of the vehicle.

FIGS. 1 and 2 are views illustrating a variable control apparatus for an airbag of a vehicle according to embodiments of the present invention, FIG. 3 is a flow chart illustrating a variable control method for an airbag of a vehicle at the time of front collision according to embodiments of the present invention, FIG. 4 is a side view illustrating a deployment shape of an airbag cushion according to embodiments of the present invention, in a case in which a seat faces a front side of the vehicle and a reclining angle of a seat back is a predetermined angle or smaller, FIG. 5 is a side view illustrating an inside of the vehicle according to embodiments of the present invention, in a case in which a seat faces a front side of the vehicle and a reclining angle of a seat back is a predetermined angle or larger, FIG. 6 is a side view illustrating an inside of the vehicle according to embodiments of the present invention, in a case in which a seat faces a rear side of the vehicle and a reclining angle of a seat back is a predetermined angle or smaller, FIG. 7 is a side view illustrating a deployment shape of the airbag cushion according to embodiments of the present invention, in a case in which a seat faces a rear side of the vehicle and a reclining angle of a seat back is a predetermined angle or larger, FIG. 8 is a plan view illustrating a deployment shape of the airbag cushion according to embodiments of the present invention, in a case in which a seat faces a right side of the vehicle, FIG. 9 is a side view illustrating a deployment shape of the airbag cushion according to embodiments of the present invention, in a case in which a seat faces a side of the vehicle, and FIG. 10 is a plan view illustrating a deployment shape of the airbag cushion according to embodiments of the present invention, in a case in which a seat faces a left side of the vehicle.

First, referring to FIG. 1, a variable control apparatus for an airbag of a vehicle according to the present disclosure may include a plurality of tethers having one sides coupled to a front sheath contacting a passenger among sheaths of an airbag cushion 10, and formed to have a length shorter than a distance between the front sheath and a rear sheath when the airbag cushion 10 is fully deployed; a release mechanism 40 provided at the rear sheath side of the airbag cushion 10, connected to the other sides of the plurality of tethers, and selectively releasing a tether among the plurality of connected tethers upon an operation thereof; and a controller 50 variably controlling a deployment shape of the airbag cushion 10 by operating the release mechanism based on a collision direction of the vehicle, a seat state, or a sitting posture.

Here, as the airbag cushion 10, a passenger air bag (PAB) will be mainly described. However, the present disclosure may be applied to all airbags deployed toward a passenger from a front of the passenger according to a vehicle, thus it should not be limited to a specific airbag.

In the present disclosure, the plurality of tethers have one ends connected to the front sheath of the airbag cushion 10, and the other ends connected to the release mechanism formed at the rear sheath side of the airbag cushion 10. Particularly, the plurality of tethers have a length shorter than the distance between the front sheath and the rear sheath, thus when the airbag cushion 10 is deployed in a state in which the connection of the tethers is maintained, a deployment shape of the airbag cushion 10 is limited. On the contrary, if the plurality of tethers are cut by the release mechanism 40, the airbag cushion 10 may be deployed in an original full deployment shape.

Meanwhile, in the present disclosure, a single release mechanism 40 may be provided to release the connection with the plurality of tethers as illustrated in FIGS. 1 and 2, and alternatively, a plurality of release mechanisms 40 may be provided to be connected to the plurality of tethers, respectively. This may vary depending on a designer and be applied to the vehicle. Thus, it is to be noted that the number of release mechanism 40 should not be limited to a specific number. In embodiments of the present disclosure, as the release mechanism 40, a mechanism cutting the tether may be provided. A release mechanism 40 operated using another mechanism will be described later.

Further, in the present disclosure, the controller 50 controls the release mechanism 40 based on the collision direction of the vehicle, the seat state, or the sitting posture to thereby vary the deployment shape of the airbag cushion 10.

That is, when a vehicle collision occurs, the controller 50 operates an inflator 80 by detecting the collision situation, and may vary the deployment shape of the airbag cushion 10 according to data such as the collision direction of the vehicle, the seat state, or the sitting posture, such that it is possible to more effectively protect the passenger.

At this time, the controller 50 may detect the collision direction of the vehicle through a collision sensor and detect the seat state and the sitting posture through a seat rotation sensor, a seat back angle sensor, and a seat sliding sensor.

Specifically, at the time of front collision of the vehicle, if the seat is in a state in which an angle of rotation of the seat from a reference position is smaller than a first setting angle to face a front side of the vehicle, and a reclining angle formed between a seat cushion and the seat back is a reference angle or smaller, the controller 50 may deploy the airbag cushion 10 and operate the release mechanism 40 to release all the plurality of tethers.

Referring to FIGS. 1, 3, and 4, the controller 50 detects a front collision situation of the vehicle based on a collision signal received from the collision sensor (S100).

When detecting the occurrence of the front collision of the vehicle, the controller 50 measures a degree of rotation of the seat based on a vertical rotation axis in order to check a direction that the seat faces. Here, the reference position of the seat means a seat position at which the passenger faces the front side of the vehicle in an upright sitting posture, and the first setting angle is an angle at which it may be assumed that the seat faces the front side of the vehicle, that is a value calculated through multiple experiments. If the rotation angle of the seat is smaller than the first setting angle, it may be determined that the seat is operated to face the front side of the vehicle.

As such, the direction that the seat faces is checked by using the degree of the rotation of the seat based on the vertical rotation axis (S110).

Here, the direction that the seat faces may be defined to be the same as a direction that the passenger faces when the passenger sits on the seat in the upright sitting posture. Further, the seat state of the vehicle may be checked by using the seat rotation sensor.

If the seat is set to face the front side of the vehicle, the controller 50 senses the reclining angle formed between the seat cushion and the seat back using the seat back angle sensor and compares the reclining angle with a reference angle (S120). Here, the reclining angle is defined to be decreased as the seat back is folded toward the seat cushion, and to be increased as the seat back is reclined.

Therefore, if the seat 60 faces the front side of the vehicle and the seat back is not excessively reclined, the controller 50 releases all the plurality of tethers using the release mechanism 40 to normally deploy the airbag cushion 10 in an original shape, thereby effectively protecting the passenger (S130).

The present disclosure further includes an inflator provided to deploy the airbag cushion 10 in a high-pressure mode, a middle-pressure mode, or a low-pressure mode depending on a deployment pressure when deploying the airbag cushion 10, and at the time of the front collision of the vehicle, if the seat 60 is in the state in which the angle of rotation of the seat 60 from the reference position is smaller than the first setting angle to face the front side of the vehicle, and the reclining angle is smaller than the reference angle, the controller 50 may operate the inflator in the high-pressure mode (S130).

That is, the controller 50 controls the inflator to deploy the airbag cushion 10, and the deployment pressure is set to be gradually increased in order of the low-pressure mode, the middle-pressure mode, and the high-pressure mode. Particularly, if the seat 60 faces the front side of the vehicle, and the reclining angle of the seat back is the reference angle or smaller, the controller 50 determines that the seat is normally set and deploys the airbag cushion 10 in the high-pressure mode to preferentially protect the passenger.

Meanwhile, referring to FIGS. 1, 3, and 5, in the present disclosure, at the time of the front collision of the vehicle, if the seat 60 is in the state in which the angle of rotation of the seat 60 from the reference position is smaller than the first setting angle to face the front side, and the reclining angle formed between the seat cushion and the seat back is larger than the reference angle, the controller 50 may inhibit the deployment of the airbag cushion 10 (S140).

In particular, the present disclosure aims to deploy the airbag cushion corresponding to various changes in the sitting posture of the passenger at the time of collision of the vehicle since a space in the vehicle may be changed into a space for rest or work in addition to the driving if an autonomous vehicle is commercialized.

That is, in the situation in which the seat 60 is sent to face the front side of the vehicle (S110), if the reclining angle of the seat back is larger than the reference angle, that is, in the situation in which the passenger is taking a rest by reclining the seat back as illustrated in FIG. 5, the airbag cushion 10 itself is not deployed, thereby making it possible to prevent unnecessary deployment of the airbag cushion that is ineffective in protecting the passenger (S140).

Further, referring to FIGS. 1, 3, and 6, in the present disclosure, at the time of the front collision of the vehicle, if the seat 60 is in a state in which an angle of rotation of the seat 60 from the reference position is larger than a second setting angle to face the rear side, a distance between a head rest or seat back of the seat 60 and a crash pad is a predetermined distance or longer, and the reclining angle formed between the seat cushion and the seat back is the reference angle or smaller, the controller 50 may deploy the airbag cushion 10 but inhibit an operation of the release mechanism 40 (S150).

Here, the second setting angle is set to be larger than the first setting angle, and means an angle value at which it may be determined that the seat 60 faces the rear side.

That is, if the seat 60 is rotated to face the rear side of the vehicle and the reclining angle of the seat back is the reference angle or smaller, since a distance between the seat back and an instrument panel is sufficiently secured as illustrated in FIG. 6, the controller 50 deploys the airbag cushion 10 at the time of front collision of the vehicle, such that it is possible to prevent impact from occurring as the seat back is leant forward or the instrument panel bumps to the rear side of the seat back.

At this time, the controller 50 does not operate the release mechanism 40 to maintain all the plurality of tethers, thereby limiting a deployment amount of the airbag cushion 10. That is, it is possible to prevent the passenger from feeling uncomfortable due to impact applied to the seat back as the airbag cushion 10 is excessively deployed.

Further, at the time of the front collision of the vehicle, if the seat 60 is in the state in which the angle of rotation of the seat 60 from the reference position is larger than the second setting angle to face the rear side, the distance between the head rest or seat back of the seat 60 and the crash pad is the predetermined distance or longer, and the reclining angle of the seat back is the reference angle or smaller, the controller 50 may operate the inflator in the low-pressure mode.

This is to prevent the impact from being applied to the seat back as the airbag cushion 10 is deployed at an excessive pressure when the airbag cushion 10 is deployed toward the rear side of the seat back. By doing so, passenger safety may be improved.

Further, referring to FIGS. 1, 3, and 7, in the present disclosure, at the time of the front collision of the vehicle, if the seat 60 is in the state in which the angle of rotation of the seat 60 from the reference position is larger than the second setting angle to face the rear side of the vehicle, the distance between the head rest or seat back of the seat 60 and the crash pad is shorter than the predetermined distance, and the reclining angle formed between the seat cushion and the seat back is larger than the reference angle, the controller 50 may inhibit the deployment of the airbag cushion (S160).

If the seat 60 faces the rear side of the vehicle, and the reclining angle of the seat back is large, that is, if an interval between the seat back and the instrument panel is narrow, impact may be applied to the seat back as the airbag cushion 10 is deployed. Therefore, it is preferred not to deploy the airbag cushion 10 for safety and protection of the passenger.

More specifically, referring to FIG. 1, in the variable control apparatus for an airbag of a vehicle according to the present technology, the front sheath of the airbag cushion 10 may be divided into an upper portion that is a portion where a head of the passenger contacts, and a lower portion that is a portion where a chest of the passenger contacts when the passenger is loaded, and the plurality of tethers may be configured to include a first upper tether 23 having one side coupled to a left side of the upper portion of the front sheath of the airbag cushion 10, a second upper tether 25 having one side coupled to a right side of the upper portion of the front sheath of the airbag cushion 10, and a lower tether 30 having one side coupled to the lower portion of the front sheath of the airbag cushion 10.

That is, the plurality of tethers are widely connected to the front sheath of the airbag cushion 10, thereby making it possible to vary the shape of the airbag cushion 10.

Referring to FIGS. 1, 3, and 8, in the present disclosure, at the time of the front collision, if the seat 60 is rotated from the reference position based on the vertical rotation axis in a clockwise direction at a predetermined setting angle range to face the right side, the controller 50 may deploy the airbag cushion 10 and operate the release mechanism 40 to release the first upper tether 23.

Further, referring to FIGS. 1, 3, 9, and 10, at the time of the front collision, if the seat 60 is rotated from the reference position based on the vertical rotation axis in a counter-clockwise direction at the predetermined setting angle range to face the left side, the controller 50 may deploy the airbag cushion 10 and operate the release mechanism 40 to release the second upper tether 25.

Here, the setting angle range is a seat rotation angle at which it may be determined that the seat 60 faces the left side or the right side, and may mean an angle range between the first setting angle and the second setting angle.

That is, if the controller 50 detects that the vehicle is in the front collision situation (S100), and the seat 60 faces the right side of the vehicle (S110), the controller 50 releases the first upper tether 23 connected to the left side of the upper portion of the front sheath of the airbag cushion 10, and on the contrary, if the front collision of the vehicle occurs in the state in which the seat 60 faces the left side of the vehicle, the second upper tether 25 connected to the right side of the upper portion of the front sheath of the airbag cushion 10 is released, thereby forming a shape of the airbag cushion 10 that may effectively support the head and an upper body of the passenger.

Here, the controller 50 may use the seat rotation sensor to detect the direction that the seat 60 faces.

Specifically, if the seat 60 is rotated to face the side of the vehicle, the head of the passenger will be positioned further back in the vehicle than the shoulder of the passenger, when the passenger sits in the upright sitting posture. Therefore, at the time of collision of the vehicle, only part of the upper portion of the front sheath of the airbag cushion 10 is further deployed toward the rear side of the vehicle, to thereby more softly cushion the passenger. As a result, the protection performance of the airbag cushion 10 is improved.

At this time, if the seat faces the left side or the right side of the vehicle, the controller 50 may operate the inflator in the middle-pressure mode.

Meanwhile, in the present disclosure, the lower tether 30 may be configured to include a first lower tether 33 having one side coupled to a left side of the lower portion of the front sheath of the airbag cushion, and a second lower tether 35 having one side coupled to a right side of the lower portion of the front sheath of the airbag cushion 10.

That is, if the airbag cushion 10 is deployed in a state in which the plurality of tethers are not released, the deployment may be made in a state in which the front sheath of the airbag cushion 10 to which the tethers are connected is partially recessed. This may hinder the passenger protection performance of the airbag, thus the lower tether is configured of the first and second lower tethers 33 and 35 supporting the left side and the right side of the lower portion of the front sheath of the air cushion 10 such that the airbag cushion 10 may be deployed evenly in balance as much as possible.

Figure 11:
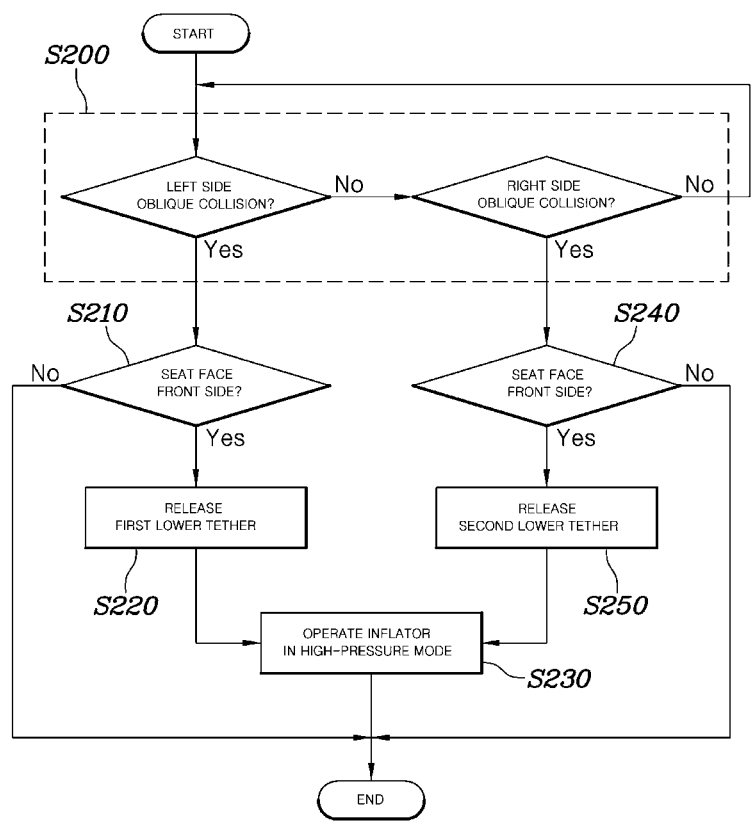
FIG. 11 is a flow chart illustrating a variable control method for an airbag of a vehicle according to embodiments of the present disclosure at the time of front collision.
Figure 12:
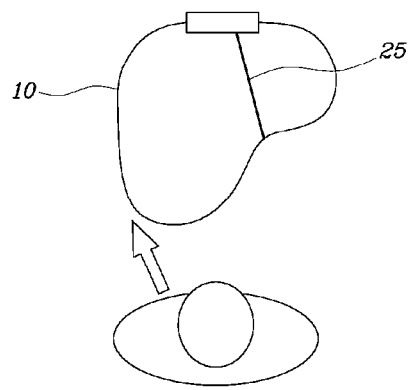
FIG. 12 is a plan view illustrating a deployment shape of the airbag cushion according to embodiments of the present disclosure at the time of left side oblique collision.
Figure 13:
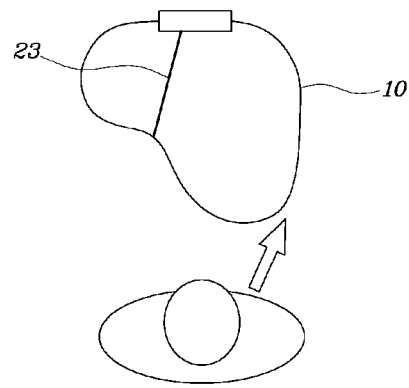
FIG. 13 is a plan view illustrating a deployment shape of the airbag cushion according to embodiments of the present disclosure at the time of right side oblique collision.
Figure 14:
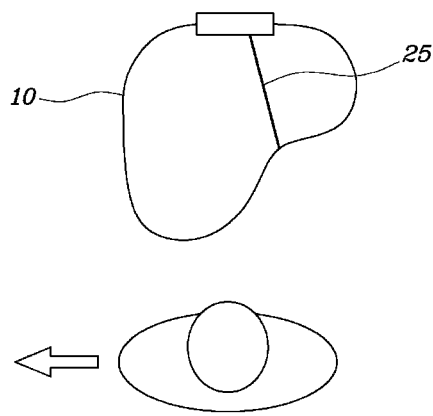
FIG. 14 is a plan view illustrating a deployment shape of the airbag cushion according to embodiments of the present disclosure, in a case in which a seat is slid toward a left side.
Figure 15:
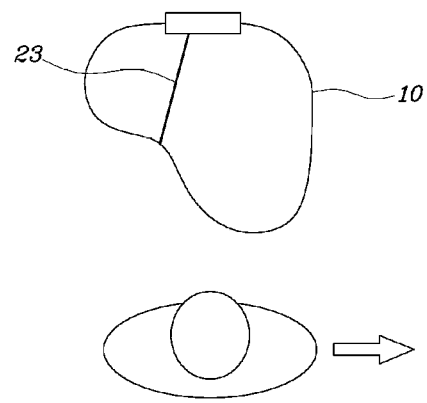
FIG. 15 is a plan view illustrating a deployment shape of the airbag cushion according to embodiments of the present disclosure, in a case in which a seat is slid toward a right side.

FIG. 11 is a flow chart illustrating a variable control method for an airbag of a vehicle according to embodiments of the present disclosure at the time of front collision, FIG. 12 is a plan view illustrating a deployment shape of the airbag cushion according to embodiments of the present disclosure at the time of left side oblique collision, FIG. 13 is a plan view illustrating a deployment shape of the airbag cushion according to embodiments of the present disclosure at the time of right side oblique collision, FIG. 14 is a plan view illustrating a deployment shape of the airbag cushion according to embodiments of the present disclosure, in a case in which a seat is slid toward a left side, and FIG. 15 is a plan view illustrating a deployment shape of the airbag cushion according to embodiments of the present disclosure, in a case in which a seat is slid toward a right side.

Referring to FIGS. 2, 11, and 12, at the time of left side oblique collision of the vehicle (S200), if the seat 60 is in the state in which the angle of rotation of the seat 60 from the reference position is smaller than the first setting angle to face the front side of the vehicle (S210), the controller 50 may deploy the airbag cushion 10 and operate the release mechanism 40 to release the first lower tether 33 (S220).

That is, if the oblique collision occurs in the state in which the seat 60 is set to face the front side of the vehicle, the passenger is loaded in an oblique collision direction from the state of facing the front side. If the left side oblique collision occurs, the first lower tether 33 of the airbag cushion 10 may be released to increase an expansion amount of a portion of the airbag cushion 10 where the passenger is loaded, such that it is possible to prevent the head of the passenger from deviating from the airbag cushion 10, thereby improving the passenger protection performance.

Further, referring to FIGS. 2, 11, and 13, at the time of right side oblique collision of the vehicle (S200), if the seat 60 is in the state in which the angle of rotation of the seat 60 from the reference position is smaller than the first setting angle to face the front side (S240), the controller 50 may deploy the airbag cushion 10 and operate the release mechanism 40 to release the second lower tether 35 (S250).

That is, if the right side oblique collision occurs, the second lower tether 35 of the airbag cushion 10 may be released to increase an expansion amount of a right side of the airbag cushion 10 where the passenger is loaded, thereby improving the passenger protection performance.

At this time, it is preferable to operate the inflator in the high-pressure mode to effectively protect the passenger (S230).

Meanwhile, referring to FIGS. 2, 3, and 14, at the time of front collision of the vehicle, if the seat 60 is slid in a left side direction from a reference position by a setting distance or longer (S125), the controller 50 may deploy the airbag cushion 10 and operate the release mechanism 40 to release the first lower tether 33 (S135).

That is, a seat of an autonomous vehicle may be designed to be slidable in left and right directions. At this time, the position of the slid seat may be detected through the seat sliding sensor, and the controller 50 may vary the release operation of the release mechanism 40 according to the position of the seat 60, thereby improving the passenger protection performance.

If the seat 60 is slid in the left side direction, the passenger is directly loaded on the left side portion of the airbag cushion 10 even when the front collision occurs, thus the controller 50 may release the first lower tether 33 connected to the left side portion of the airbag cushion 10 to increase an expansion amount of the left side of the airbag cushion 10, thereby improving the passenger protection performance.

Further, referring to FIGS. 2, 3, and 15, at the time of front collision of the vehicle, if the seat 60 is slid in a right side direction from the reference position by the setting distance or longer (S125), the controller 50 may deploy the airbag cushion 10 and operate the release mechanism 40 to release the second lower tether 35 (S135).

That is, if the seat 60 is slid in the right side direction, the passenger contacts a right side surface of the airbag cushion 10 when the front collision occurs, thus the controller 50 may release the second lower tether 35 to improve the passenger protection performance.

Figure 16:
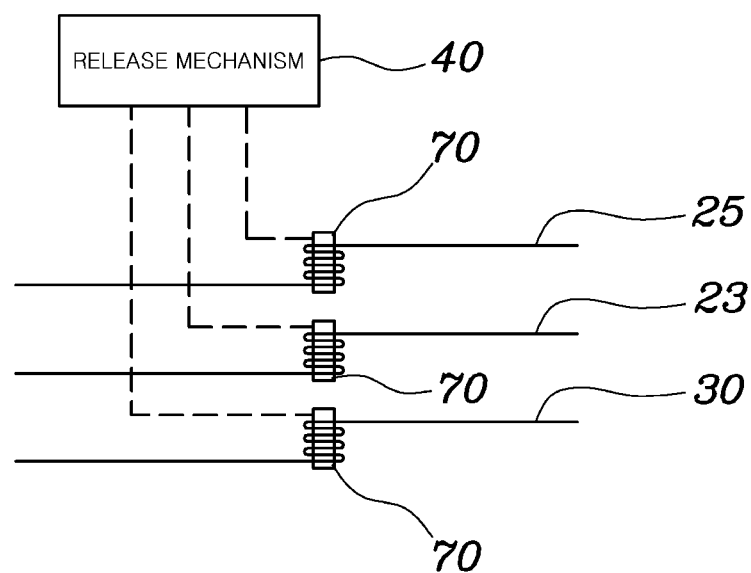
FIG. 16 is a view schematically illustrating a variable control apparatus for an airbag of a vehicle according to embodiments of the present disclosure, in a case in which a plurality of tethers are bent by constrainers.

FIG. 16 is a view schematically illustrating a variable control apparatus for an airbag of a vehicle according to embodiments of the present disclosure, in a case in which a plurality of tethers are bent by constrainers.

As shown in FIG. 16, a variable control apparatus for an airbag of a vehicle according to embodiments of the present disclosure may include a plurality of tethers 23, 25, and 30 having one sides coupled to a front sheath contacting a passenger among sheaths of an airbag cushion 10, and formed to have a length that is normally shorter than a distance between the front sheath 10a and a rear sheath 10b when the airbag cushion 10 is fully deployed by constrainers 70 and is extended when constraint by the constrainers 70 is released; a release mechanism 40 provided at the rear sheath side of the airbag cushion 10, connected to the constrainers 70 of the plurality of tethers, and selectively releasing constraint of a constrainer 70 among the connected constrainers upon an operation thereof; and a controller variably controlling a deployment shape of the airbag cushion 10 by operating the release mechanism 40 based on a collision direction of the vehicle, a seat state, or a sitting posture.

That is, the plurality of tethers 23, 25, and 30 are bent by the constrainers 70 to have the length shorter than the distance between the front sheath and the rear sheath of the airbag cushion, and when the constrainers 70 are released by the release mechanism 40, the length thereof is extended to fully deploy the airbag cushion 10.

FIG. 16 illustrates that a single lower tether 30 is provided, but according to embodiments of the present disclosure, a plurality of lower tethers may be dividedly provided as described above.

According to the variable control apparatus for an airbag of a vehicle described herein, a shape of the airbag cushion deployed at the time of front collision of the vehicle may vary according to various seat operation states, thereby to maximize passenger protection.

Although the present disclosure has been shown and described with respect to certain embodiments, it will be obvious to those skilled in the art that the present disclosure may be variously modified and altered without departing from the spirit and scope of the present disclosure as defined by the following claims.

What is claimed is:

1. A variable control apparatus for an airbag of a vehicle, the variable control apparatus comprising:
a plurality of tethers each of which having one side coupled to a front sheath among a plurality of sheaths of an airbag cushion, each of the plurality of tethers formed to have a length shorter than a distance between the front sheath and a rear sheath when the airbag cushion is fully deployed;
a release mechanism provided at a portion of the airbag cushion adjacent to the rear sheath of the airbag cushion, connected to the respective other sides of the plurality of tethers, and selectively releasing a tether among the plurality of tethers upon an operation of the release mechanism; and
a controller configured to variably control a deployment shape of the airbag cushion by operating the release mechanism based on a collision direction of the vehicle, a seat state of a seat of the vehicle, or a sitting posture of a passenger in the vehicle,
wherein, upon a front collision of the vehicle, if the seat is in a state in which an angle of rotation of the seat from a reference position is smaller than a first setting angle to face a front side of the vehicle, and a reclining angle formed between a seat cushion and a seat back of the seat is a reference angle or smaller, the controller deploys the airbag cushion and operates the release mechanism to release all the plurality of tethers.

2. The variable control apparatus for an airbag of a vehicle of claim 1, further comprising:
an inflator configured to deploy the airbag cushion in a high-pressure mode, a middle-pressure mode, or a low-pressure mode based on a deployment pressure when deploying the airbag cushion,
wherein, upon the front collision of the vehicle, when the seat is in the state in which the angle of rotation of the seat from the reference position is smaller than the first setting angle to face the front side of the vehicle, and the reclining angle formed between the seat cushion and the seat back is the reference angle or smaller, the controller operates the inflator in the high-pressure mode.

3. The variable control apparatus for an airbag of a vehicle of claim 1, wherein, upon a front collision of the vehicle, when the seat is in a state in which an angle of rotation of the seat from a reference position is smaller than a first setting angle to face a front side of the vehicle, and a reclining angle formed between a seat cushion and a seat back of the seat is larger than a reference angle, the controller inhibits deployment of the airbag cushion.

4. The variable control apparatus for an airbag of a vehicle of claim 1, wherein, upon a front collision of the vehicle, when the seat is in a state in which an angle of rotation of the seat from a reference position is larger than a second setting angle to face a rear side of the vehicle, a distance between a headrest or seatback of the seat and a crash pad is a setting distance or longer, and a reclining angle formed between a seat cushion and the seat back of the seat is a reference angle or smaller, the controller deploys the airbag cushion but inhibits an operation of the release mechanism.

5. The variable control apparatus for an airbag of a vehicle of claim 4, further comprising:
an inflator configured to deploy the airbag cushion in a high-pressure mode, a middle-pressure mode, or a low-pressure mode based on a deployment pressure when deploying the airbag cushion,
wherein, upon the front collision of the vehicle, when the seat is in the state in which the angle of rotation of the seat from the reference position is larger than the second setting angle to face the rear side, the distance between the headrest or seatback of the seat and the crash pad is the setting distance or longer, and the reclining angle formed between the seat cushion and the seat back is the reference angle or smaller, the controller operates the inflator in the low-pressure mode.

6. The variable control apparatus for an airbag of a vehicle of claim 1, wherein, upon a front collision of the vehicle, when the seat is in a state in which an angle of rotation of the seat from a reference position is larger than a second setting angle to face a rear side of the vehicle, a distance between a headrest or seatback of the seat and a crash pad is shorter than a setting distance, and a reclining angle formed between a seat cushion and the seat back of the seat is larger than a reference angle, the controller inhibits deployment of the airbag cushion.

7. The variable control apparatus for an airbag of a vehicle of claim 1, wherein:
the front sheath of the airbag cushion is divided into an upper portion proximate a head of the passenger when the airbag cushion is deployed, and a lower portion that is a portion proximate a chest of the passenger when the airbag cushion is deployed, and
the plurality of tethers include a first upper tether having one side coupled to a left side of the upper portion of the front sheath, a second upper tether having one side coupled to a right side of the upper portion of the front sheath, and a lower tether having one side coupled to the lower portion of the front sheath.

8. The variable control apparatus for an airbag of a vehicle of claim 7, wherein, upon a front collision of the vehicle, when the seat is rotated from a reference position based on a vertical rotation axis in a clockwise direction at a predetermined setting angle range to face a right side of the vehicle, the controller deploys the airbag cushion and operates the release mechanism to release the first upper tether.

9. The variable control apparatus for an airbag of a vehicle of claim 8, further comprising:
an inflator configured to deploy the airbag cushion in a high-pressure mode, a middle-pressure mode, or a low-pressure mode based on a deployment pressure when deploying the airbag cushion,
wherein, upon the front collision of the vehicle, when the seat is rotated based on the vertical rotation axis in the clockwise or counterclockwise direction at the setting angle range, the controller operates the inflator in the middle-pressure mode.

10. The variable control apparatus for an airbag of a vehicle of claim 7, wherein, upon a front collision of the vehicle, if a when the seat is rotated from a reference position based on a vertical rotation axis in a counterclockwise direction at a predetermined setting angle range to face a left side of the vehicle, the controller deploys the airbag cushion and operates the release mechanism to release the second upper tether.

11. The variable control apparatus for an airbag of a vehicle of claim 10, further comprising:
an inflator configured to deploy the airbag cushion in a high-pressure mode, a middle-pressure mode, or a low-pressure mode depending on a deployment pressure when deploying the airbag cushion,
wherein, upon the front collision of the vehicle, when the seat is rotated based on the vertical rotation axis in the clockwise or counterclockwise direction at the setting angle range, the controller operates the inflator in the middle-pressure mode.

12. The variable control apparatus for an airbag of a vehicle of claim 7, wherein the lower tether includes a first lower tether having one side coupled to a left side of the lower portion of the front sheath and a second lower tether having one side coupled to a right side of the lower portion of the front sheath of the airbag cushion.

13. The variable control apparatus for an airbag of a vehicle of claim 12, wherein, upon a left side oblique collision of the vehicle, when the seat is in a state in which an angle of rotation of the seat from a reference position is smaller than a first setting angle to face a front side of the vehicle, the controller deploys the airbag cushion and operates the release mechanism to release the first lower tether.

14. The variable control apparatus for an airbag of a vehicle of claim 12, wherein, upon a right side oblique collision of the vehicle, when the seat is in a state in which an angle of rotation of the seat from a reference position is smaller than a first setting angle to face a front side of the vehicle, the controller deploys the airbag cushion and operates the release mechanism to release the second lower tether.

15. The variable control apparatus for an airbag of a vehicle of claim 12, wherein, upon the front collision of the vehicle, when the seat is slid in a left side direction from a reference position by a setting distance or longer, the controller deploys the airbag cushion and operates the release mechanism to release the first lower tether.

16. The variable control apparatus for an airbag of a vehicle of claim 12, wherein, upon the front collision of the vehicle, when the seat is slid in a right side direction from a reference position by a setting distance or longer, the controller deploys the airbag cushion and operates the release mechanism to release the second lower tether.

17. A variable control apparatus for an airbag of a vehicle, the variable control apparatus comprising:
a plurality of tethers each of which having one side coupled to a front sheath among a plurality of tethers of an airbag cushion, each of the plurality of sheaths formed to have a length shorter than a distance between the front sheath and a rear sheath when the airbag cushion is fully deployed by constrainers and is extended when constraint is released, wherein each one of the constrainers is connected with one of the plurality of tethers;

a release mechanism provided at a portion of the airbag cushion adjacent to the rear sheath of the airbag cushion, connected to the constrainers of the plurality of tethers, respectively, and selectively releasing constraint of a constrainer among the connected constrainers upon an operation of the release mechanism; and a controller configured to variably control a deployment shape of the airbag cushion by operating the release mechanism based on a collision direction of the vehicle, a seat state of a seat of the vehicle, or a sitting posture of a passenger of the vehicle, wherein, upon a front collision of the vehicle, if the seat is in a state in which an angle of rotation of the seat from a reference position is smaller than a first setting angle to face a front side of the vehicle, and a reclining angle formed between a seat cushion and a seat back of the seat is a reference angle or smaller, the controller deploys the airbag cushion and operates the release mechanism to release all the plurality of tethers.

* * * * *